US009921876B2

(12) United States Patent
Higuchi

(10) Patent No.: US 9,921,876 B2
(45) Date of Patent: Mar. 20, 2018

(54) INFORMATION PROCESSING DEVICE, RESOURCE ALLOCATION METHOD, AND COMPUTER-READABLE RECORDING MEDIUM

(71) Applicant: NEC Corporation, Tokyo (JP)

(72) Inventor: Junichi Higuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 386 days.

(21) Appl. No.: 14/636,832

(22) Filed: Mar. 3, 2015

(65) Prior Publication Data

US 2015/0254203 A1    Sep. 10, 2015

(30) Foreign Application Priority Data

Mar. 4, 2014    (JP) ................................. 2014-041225

(51) Int. Cl.
*G06F 9/50* (2006.01)
(52) U.S. Cl.
CPC .... *G06F 9/5011* (2013.01); *G06F 2209/5014* (2013.01)
(58) Field of Classification Search
CPC ...................... G06F 9/5011; G06F 2209/5014
USPC ......................................................... 710/314
See application file for complete search history.

(56) References Cited

U.S. PATENT DOCUMENTS

| | | | | |
|---|---|---|---|---|
| 5,710,703 A | * | 1/1998 | Kirn ........................ | F02D 41/28 701/102 |
| 7,406,674 B1 | * | 7/2008 | Ogami ..................... | G06F 8/34 716/117 |
| 7,478,176 B2 | * | 1/2009 | Zimmer .............. | G06F 12/0646 710/10 |
| 8,695,079 B1 | * | 4/2014 | Miller ................. | H04L 63/0272 709/223 |
| 2007/0186014 A1 | * | 8/2007 | Zimmer .............. | G06F 12/0646 710/10 |
| 2008/0040526 A1 | | 2/2008 | Suzuki et al. | |

(Continued)

FOREIGN PATENT DOCUMENTS

| | | |
|---|---|---|
| JP | 2002-288104 A | 10/2002 |
| JP | 2008-046722 A | 2/2008 |
| JP | 2012-146088 A | 8/2012 |

OTHER PUBLICATIONS

Japanese Office Action, dated Nov. 7, 2017, in Japanese Application No. 2014-041225 and English Translation thereof.

*Primary Examiner* — Christopher Shin
(74) *Attorney, Agent, or Firm* — McGinn IP Law Group, PLLC.

(57) ABSTRACT

An information processing device includes a bridge unit that connects with one or a plurality of IO device groups via a network, a connection management unit that manages a connection of the bridge unit, an allocation priority instruction unit that stores an instruction or a fixed value that is a priority condition for allocating resources, a resource amount search unit that searches resources used by IO devices of an entire system that includes the IO devices, a remaining resource calculation unit that calculates a remaining resource amount, a reservation resource amount output unit that calculates and outputs a number of virtual PCI bridges and a reservation resource amount, and a virtual bridge resource setting unit that sets the bridge unit based on the number of virtual PCI bridges and the reservation resource amount.

18 Claims, 15 Drawing Sheets

(56) References Cited

U.S. PATENT DOCUMENTS

| | | | | |
|---|---|---|---|---|
| 2009/0077297 A1* | 3/2009 | Zhao | ............... | G06F 9/5011 |
| | | | | 710/314 |
| 2010/0169467 A1* | 7/2010 | Shukla | ............... | H04L 49/70 |
| | | | | 709/220 |
| 2012/0302272 A1* | 11/2012 | Hakola | ............ | H04W 72/10 |
| | | | | 455/509 |
| 2013/0061167 A1* | 3/2013 | Rhodes | ............ | G06F 11/349 |
| | | | | 715/781 |
| 2013/0159572 A1* | 6/2013 | Graham | ............ | G06F 13/387 |
| | | | | 710/104 |
| 2013/0160002 A1* | 6/2013 | Graham | .......... | G06F 9/45558 |
| | | | | 718/1 |
| 2016/0314089 A1* | 10/2016 | Apfelbaum | ...... | G06F 13/4027 |

\* cited by examiner

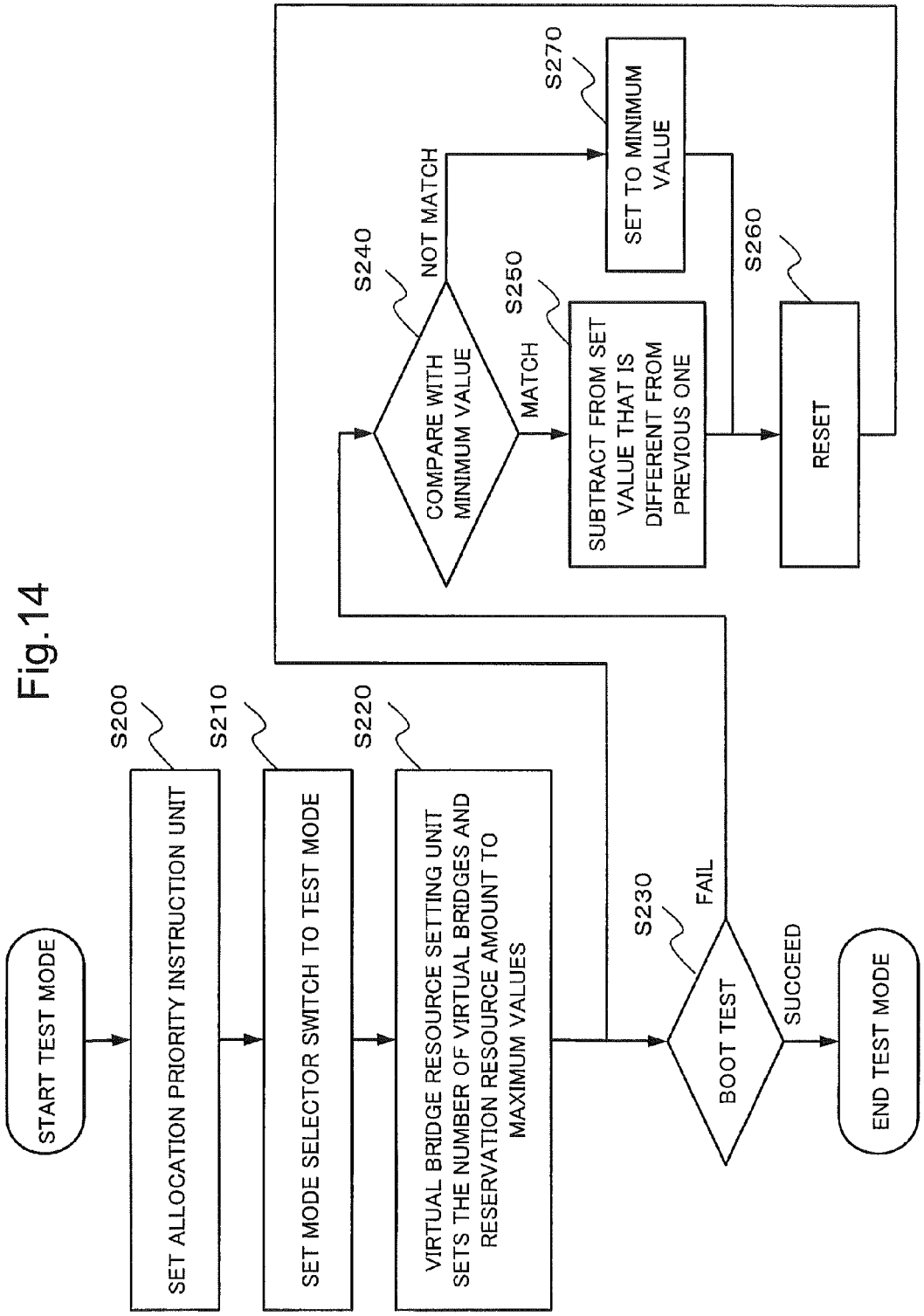

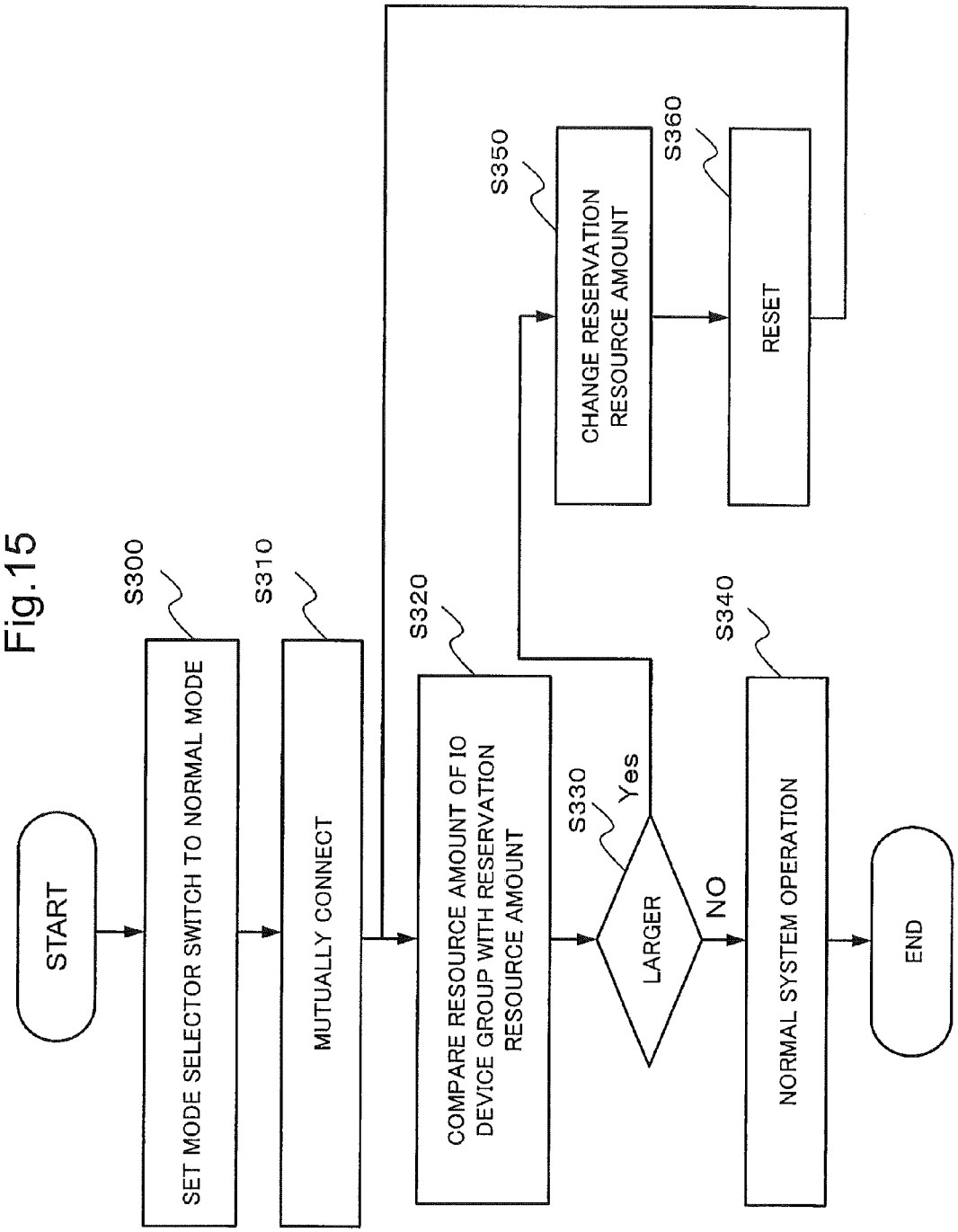

INFORMATION PROCESSING DEVICE, RESOURCE ALLOCATION METHOD, AND COMPUTER-READABLE RECORDING MEDIUM

INCORPORATION BY REFERENCE

This application is based upon and claims the benefit of priority from Japanese Patent Application No. 2014-041225, filed on Mar. 4, 2014, the disclosure of which is incorporated herein in its entirety by reference.

TECHNICAL FIELD

The present invention relates to a device that is distributively arranged on a network, in particular, relates to a resource allocation.

BACKGROUND ART

There is a technology that configures a distributed system that distributively arranges information processing devices (e.g., a CPU device group) that each include a CPU (Central Processing Unit), a memory, and a chipset, and an IO (Input Output) device group on a network (e.g., refer to Japanese Laid-open Patent Publication No. 2012-146088). This technology allows flexible connections among devices based on the distributed arrangement of a device group on a network. Thus, this technology takes away the restriction of distance and the restriction of housing, thereby enhancing extensibility of the information processing system. In addition, in this technology, by setting the group identifier (ID) of an IO device group as the same group ID as the CPU device group, to which the IO device group is desired to belong, the IO device group can be belonged to a group that includes the CPU device group. As such, this technology can enhance flexibility in a system configuration.

Further, there is a technology of reserving resources in the configuration of a CPU side bridge and an IO side bridge used in the above-described technology (e.g., refer to Japanese Laid-open Patent Publication No. 2008-046722). This technology reserves resources in a resource space that includes a memory space and an IO space by using a virtual PCI (Peripheral Components Interconnect) bridge in order to realize hot plug.

In an information processing system to be configured, some resources are fixedly occupied. Such resources are, for example, resources that are occupied by devices on the motherboard of a computer that is fixedly connected to the information processing system and resources that are occupied by peripheral devices.

Due to such fixedly occupied resources, with the technology disclosed in the above-described Japanese Laid-open Patent Publication No. 2008-046722, there is a case in which a lack of resources occurs when resources are reserved by using a virtual PCI bridge. When a lack of resources occurs, the information processing system cannot allocate appropriate resources to device groups. As a result, the information processing system, and the information processing devices (a CPU device group) and the IO device group that are included in the system cannot perform normal operation.

As such, the technologies disclosed in Japanese Laid-open Patent Publication No. 2012-146088 and Japanese Laid-open Patent Publication No. 2008-046722 have a problem where resources cannot be appropriately allocated.

SUMMARY

An exemplary object of the present invention is to provide an information processing device, a resource allocation method, and a computer-readable medium that solves the above-described problem.

An information processing device according to an exemplary aspect of the invention includes: a bridge unit that connects with one or a plurality of IO device groups via a network; a connection management unit that manages a connection of the bridge unit; an allocation priority instruction unit that stores an instruction or a fixed value that is a priority condition for allocating resources; a resource amount search unit that searches resources used by IO devices of an entire system that includes the IO devices included in the IO device groups; a remaining resource calculation unit that calculates a remaining resource amount that is obtained by subtracting the resource amount used by the IO devices from a maximum resource amount; a reservation resource amount output unit that calculates and outputs a number of virtual PCI bridges and a reservation resource amount based on the remaining resource amount and the instruction or fixed value that is the priority condition; and a virtual bridge resource setting unit that sets the bridge unit based on the number of virtual PCI bridges and the reservation resource amount.

A resource allocation method for an information processing device that connects with one or a plurality of IO device groups via a network according to an exemplary aspect of the invention, the method includes: managing the connection, storing an instruction or a fixed value that is a priority condition for allocating resources; searching resources used by IO devices of an entire system that includes the IO devices included in the IO device groups; calculating a remaining resource amount that is obtained by subtracting a resource amount used by the IO devices from a maximum resource amount; calculating and outputting a number of virtual PCI bridges and a reservation resource amount based on the remaining resource amount and the instruction or fixed value that is the priority condition; and setting a connection with the IO device groups based on the number of virtual PCI bridges and the reservation resource amount.

A computer readable non-transitory medium embodying a program according to an exemplary aspect of the invention, the program causing an information processing device, that connects with one or a plurality of IO device groups via a network, to perform a method, the method includes: managing the connection; storing an instruction or a fixed value that is a priority condition for allocating resources; searching resources used by IO devices of an entire system that includes the IO devices included in the IO device groups; calculating a remaining resource amount that is obtained by subtracting a resource amount used by the IO devices from a maximum resource amount; calculating and outputting a number of virtual PCI bridges and a reservation resource amount based on the remaining resource amount and the instruction or fixed value that is the priority condition; and setting a connection with the IO device groups based on the number of virtual PCI bridges and the reservation resource amount.

BRIEF DESCRIPTION OF THE DRAWINGS

Exemplary features and advantages of the present invention will become apparent from the following detailed description when taken with the accompanying drawings in which:

FIG. 14 is a flowchart showing an example of operation in a test mode according to the second exemplary embodiment; and FIG. 15 is a flowchart showing an example of operation in a normal mode according to the second exemplary embodiment.

EXEMPLARY EMBODIMENT

Figure 1:
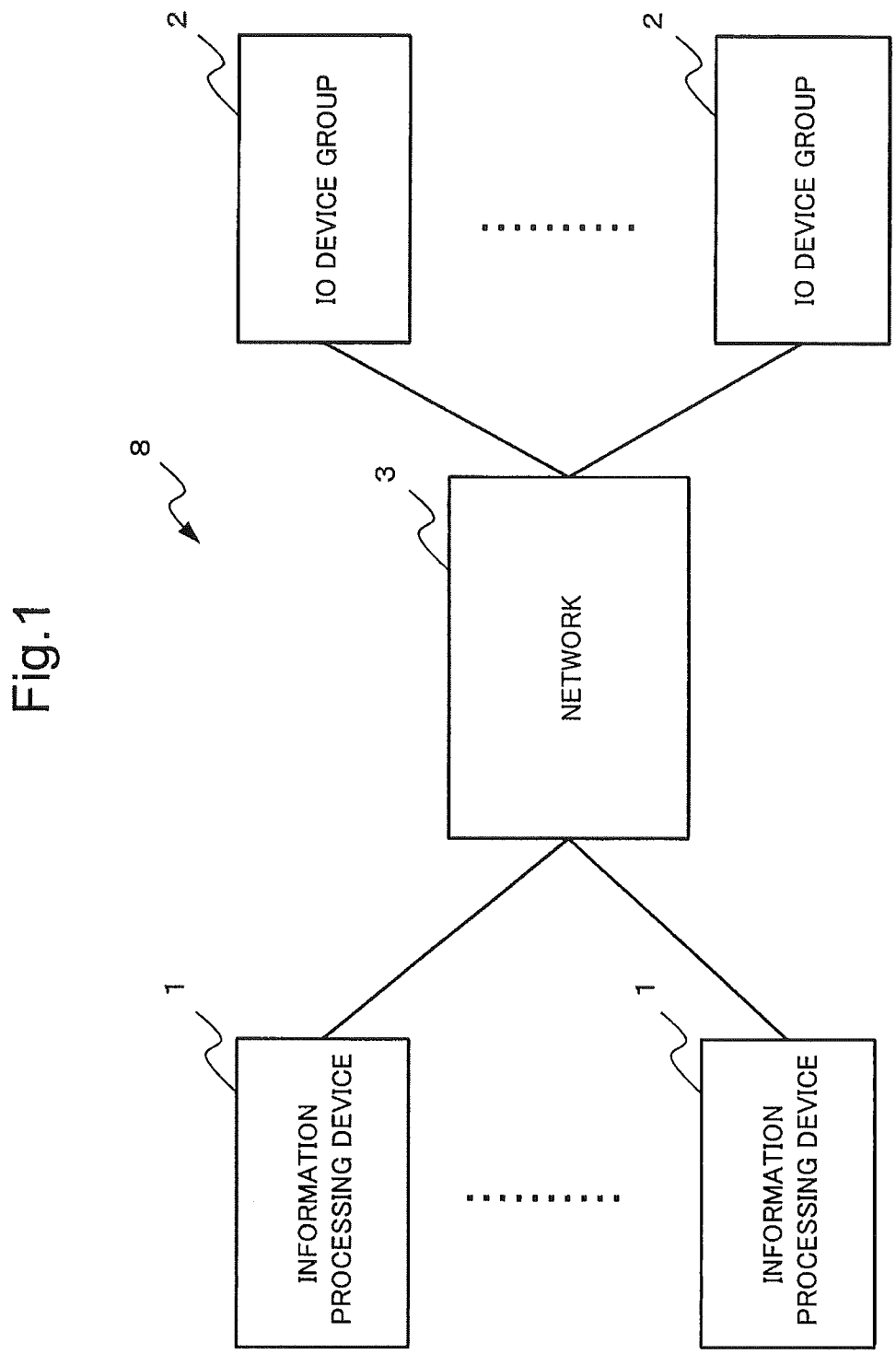
FIG. 1 is a block diagram showing an example of the overall structure of an information processing system that includes an information processing device according to a first exemplary embodiment of the present invention.

The following will describe exemplary embodiments of the present invention with reference to the drawings.

The drawings are for illustrative purposes of the exemplary embodiments of the present invention, provided the present invention is not restricted to the illustration of the drawings. Further, like numerals are appended to like components throughout the drawings, thus, a repetition of the description of such components may be omitted.

Further, in the drawings used in the following description, configurations of components that are irrelevant to the description of the present invention may be omitted and may not be shown.

First Exemplary Embodiment

[1-1] Description of Configuration

<Overall Structure of Information Processing System 8>

FIG. 1 is a block diagram showing an example of the overall structure of an information processing system 8 that includes an information processing device 1 according to the first exemplary embodiment. The information processing system 8 of the first exemplary embodiment includes one or a plurality of information processing devices 1, one or a plurality of IO device groups 2, and a network 3. In the information processing system 8, the information processing devices 1 and the IO device groups 2 are connected via the network 3.

Here, the network 3 is a communication network that connects the information processing devices 1 and the IO device groups 2. There is no particular restriction to the network 3. For example, the network 3 may be a LAN (Local Area Network) or a telephone network. Alternatively, the network 3 may include a plurality of communication networks such as the Internet. As such, the detailed description of the network 3 is not described herein.

The information processing device 1 performs processing in the information processing system 8. Further, the information processing device 1 allocates resources as will be described later.

The IO device group 2 is a device or a device group that connects with the information processing device 1 via the network 3 and realizes functions as IO device(s).

<Configuration of Information Processing Device 1>

Figure 2:
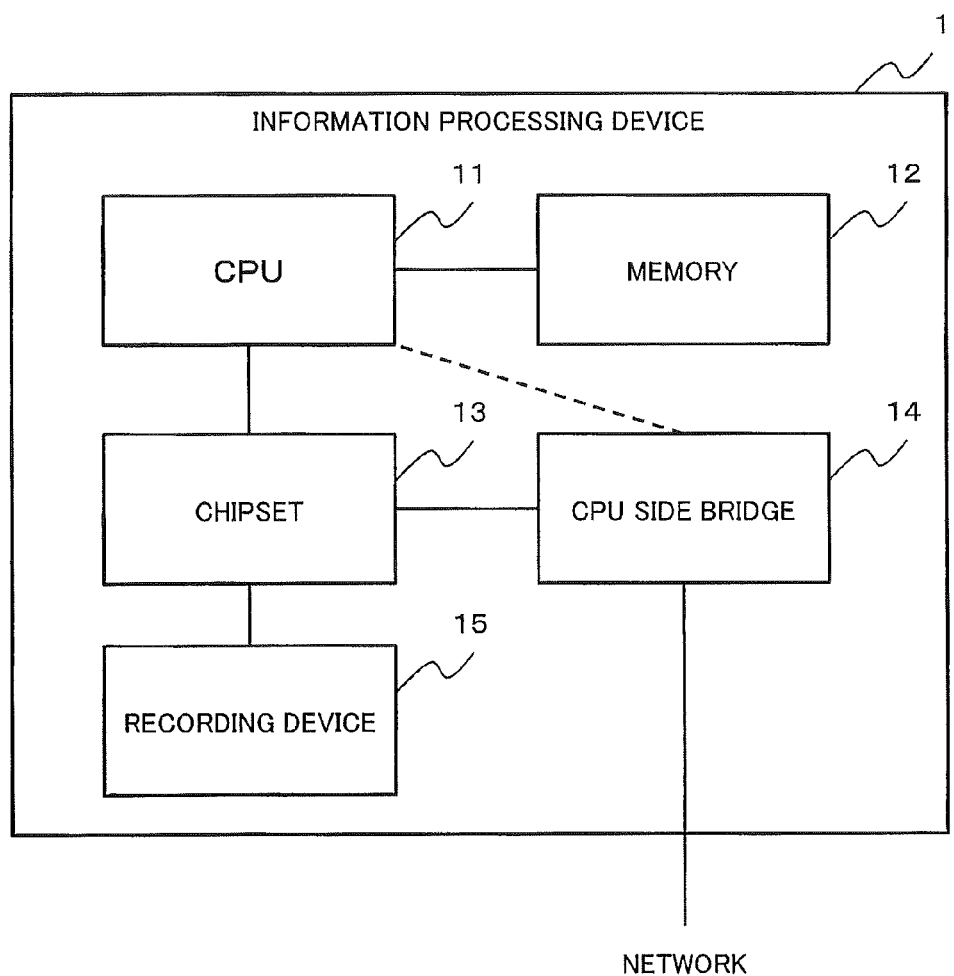
FIG. 2 is a block diagram showing an example of a configuration of the information processing device according to the first exemplary embodiment.

FIG. 2 is a block diagram showing an example of the configuration of the information processing device 1. The information processing device 1 includes one or a plurality of CPUs 11, a memory 12, a chipset 13, a CPU side bridge 14, and a recording device 15. The information processing device 1 may be realized as a computer device that includes such components.

The CPU 11 operates base on a program stored in the recording device 15 and controls the information processing device 1. The CPU 11 may read the program from a non-transitory recording medium, not shown, that stores the program in a manner readable by a computer via a recording medium reading device that is not shown in the drawings. Alternatively, the CPU 11 may receive the program from a device, not shown, via the CPU side bridge 14.

The memory 12 is a storage element such as D-RAM (Dynamic Random Access Memory), or a circuit. The memory 12 may operate as a temporary storage of the CPU 11.

The chipset 13 is a single chip (e.g., Integrated Circuit (IC)) or a combination of a plurality of chips that realizes a predetermined function (for example, a connection with other circuits) by connecting with the CPU 11. The chipset 13 may support a function of the CPU 11. For example, the chipset 13 may include an auxiliary CPU (co-processor).

As will be described in detail later herein, the CPU side bridge 14 connects the information processing device 1 and the network 3. The CPU side bridge 14 further processes a connection with the IO device group 2 as will be described later herein. The CPU side bridge 14 may be realized, for example, by an NIC (Network Interface Circuit) such as a LAN card.

The recording device 15 is a storage device such as ROM (Read Only Memory) or Flash memory, or a circuit. The recording device 15 stores a program or data for the CPU 11. The recording device 15 stores the program of BIOS (Basic Input Output System) 4 as will be described later. The BIOS 4 program is loaded into the memory 12 at the time of booting of the information processing device 1. The CPU 11 executes the loaded BIOS 4 program to realize the functions as the BIOS 4. The recording device 15 may be other device, such as a hard disk device, a magneto-optical disk device, an SSD (Solid State Drive), or a disk array device.

The components included in the information processing device 1 are connected via a predetermined bus. There is no particular restriction to the bus that connects the components of the first exemplary embodiment. As an example, the following bus will be used in the description.

The CPU 11 and the memory 12 are connected via a memory bus. The CPU 11 and the chipset 13 are connected via a CPU bus or a PCI Express (hereinafter, referred to as the "PCIe") bus.

The CPU side bridge 14 is connected with the CPU 11 or the chipset 13 via the PCIe bus. Further, the CPU side bridge 14 is connected with the network 3 in accordance with the protocol (e.g., Ethernet (registered trademark)) of the network 3.

The recording device 15 is connected with the CPU 11 or the chipset 13 using a bus that conforms to the specification of the recording device 15 (e.g., S-ATA (Serial Advanced Technology Attachment)).

The CPU 11 and the chipset 13 may also be connected with an IO device, not shown, that is connected inside the chipset 13 or via a route other than the CPU side bridge 14.

<Configuration of IO Device Group 2>

Figure 3:
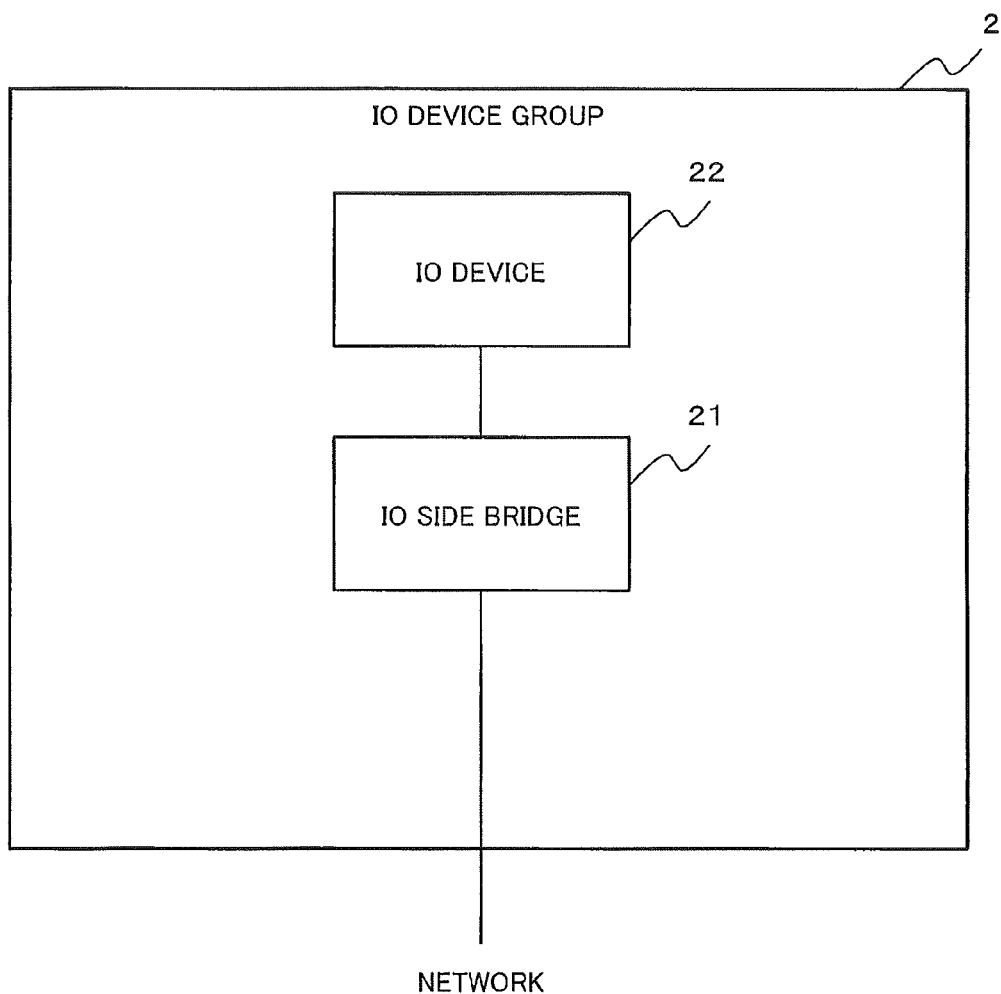
FIG. 3 is a block diagram showing an example of a configuration of an IO device group according to the first exemplary embodiment.

FIG. 3 is a block diagram showing an example of a configuration of an IO device group 2. The IO device group 2 includes one or a plurality of IO side bridges 21 and one or a plurality of IO devices 22.

The IO side bridge 21 is connected with the network 3 in accordance with the protocol (e.g., Ethernet (registered trademark)) of the network 3. Further, the IO side bridge 21 is connected with the IO device 22 via a predetermined bus (e.g., a PCIe bus).

<Configuration of CPU Side Bridge 14 and IO Side Bridge 21>

Figure 4:
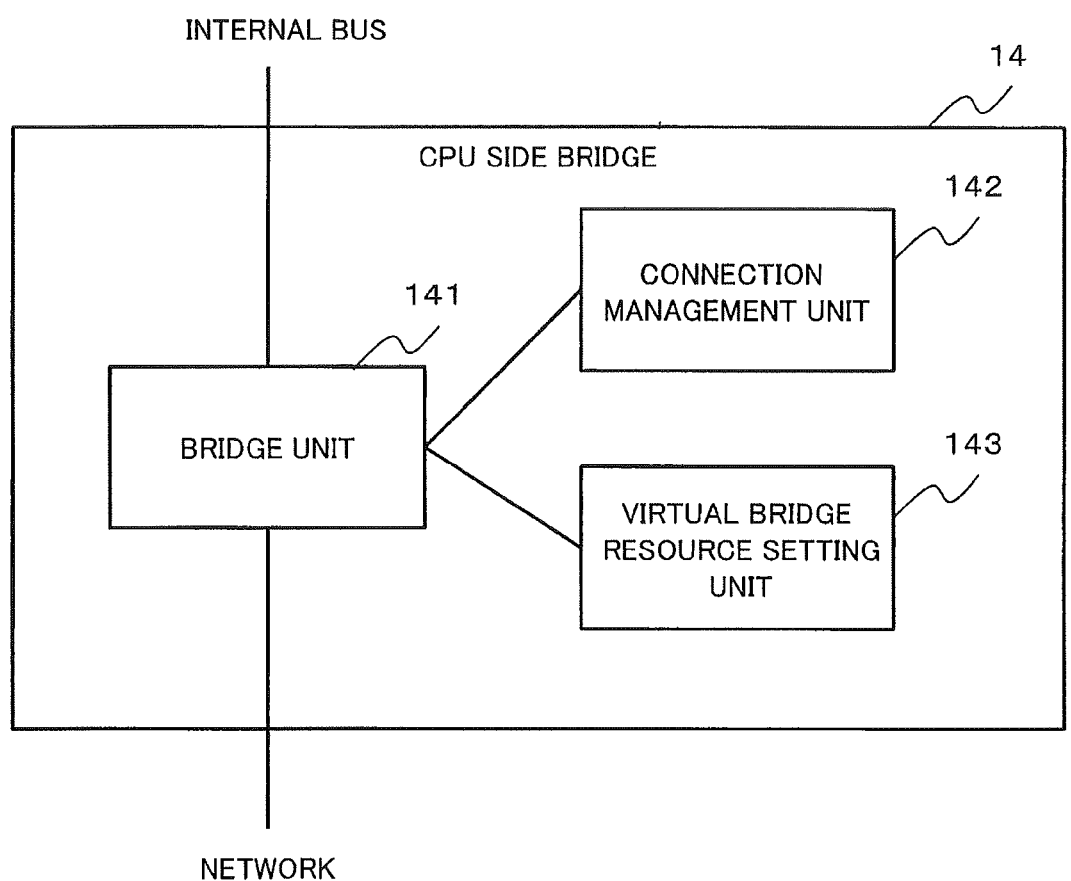
FIG. 4 is a block diagram showing an example of a configuration of a CPU side bridge according to the first exemplary embodiment.

FIG. 4 is a block diagram showing an example of the configuration of the CPU side bridge 14. The CPU side bridge 14 includes a bridge unit 141, a connection management unit 142, and a virtual bridge resource setting unit 143.

Figure 5:
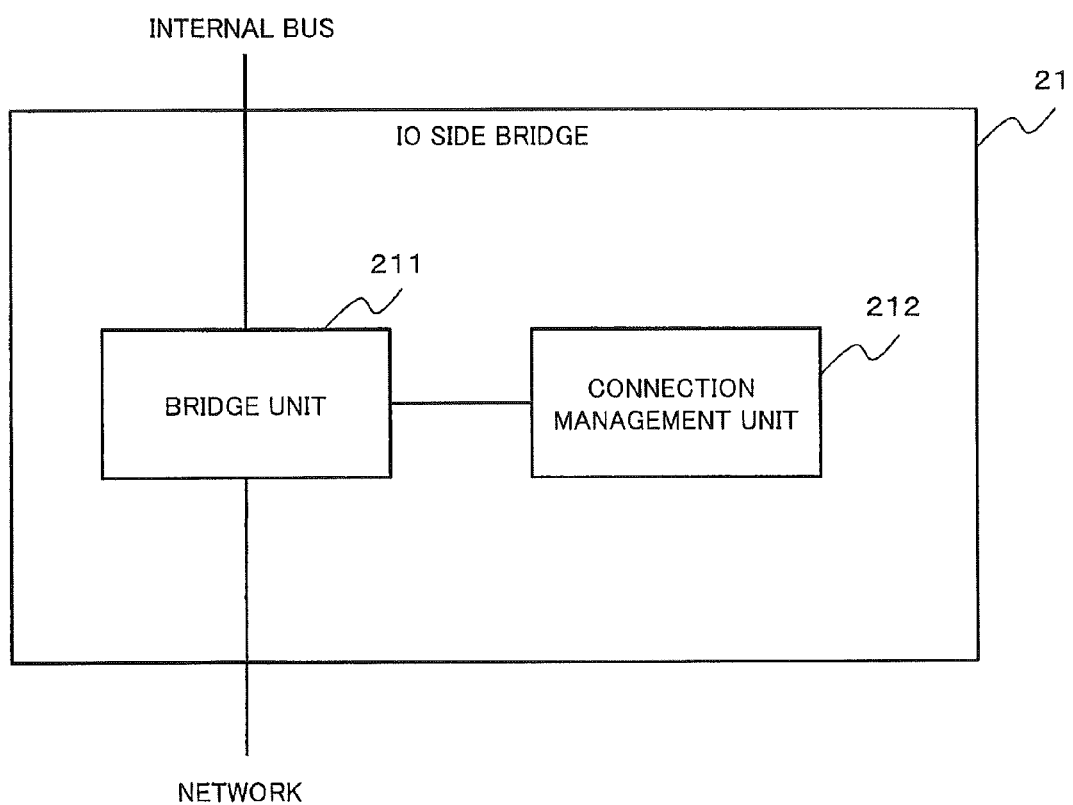
FIG. 5 is a block diagram showing an example of a configuration of an IO side bridge according to the first exemplary embodiment.

FIG. 5 is a block diagram showing an example of the configuration of the IO side bridge 21. The IO side bridge 21 includes a bridge unit 211 and a connection management unit 212.

The bridge unit 141 and the bridge unit 211 bridge between the bus (e.g., PCIe bus) inside of the device (the CPU 11 or the IO device 22) and the network 3 (e.g., Ethernet (registered trademark)).

There is no particular restriction to the bus inside the device and to the network 3 of the first exemplary embodiment. The following description uses PCIe and Ethernet (registered trademark) as the bus inside the device and the network 3 as an example.

The following will describe further detailed operation of the bridge unit 141 and the bridge unit 211.

For example, when transferring data from the CPU 11 side to the network 3 side or from the IO device 22 side to the network 3 side, the bridge unit 141 and the bridge unit 211 operate as follows. As described above, a case of transferring data from the PCIe side to the Ethernet (registered trademark) side will be described as an example.

First, the bridge unit 141 and the bridge unit 211 add an Ethernet (registered trademark) frame header for a destination to a PCIe packet that includes data. In other words, the bridge unit 141 and the bridge unit 211 encapsulate the PCIe packet for Ethernet (registered trademark). Then, the bridge unit 141 and the bridge unit 211 transmit the encapsulated packet to the network 3.

On the other hand, when transferring data from the network 3 side to the CPU 11 side or from the network 3 side to the IO device 22 side, the bridge unit 141 and the bridge unit 211 operate as follows. Here, a case of transferring data from the Ethernet (registered trademark) side to the PCIe side will be described as an example.

First, the bridge unit 141 and the bridge unit 211 receive an encapsulated packet from the network 3. The bridge unit 141 and the bridge unit 211 remove the Ethernet (registered trademark) frame header from the encapsulated packet to acquire the PCIe packet. Then, the bridge unit 141 and the bridge unit 211 transmit the PCIe packet to the PCIe side.

When the bridge unit 141 and the bridge unit 211 operate as a PCIe device, the bridge unit 141 and the bridge unit 211 have a PCI configuration register. The PCI configuration register retains the PCI configuration.

The connection management unit 142 and the connection management unit 212 have a function of managing a mutual connection between the CPU side bridge 14 and the IO side bridge 21. The CPU side bridge 14 and the IO side bridge 21 can be respectively set IDs for grouping (group IDs). Then, the CPU side bridge 14 and the IO side bridge 21 that have the same group ID connect each other. The connected CPU side bridge 14 operates as an upstream port of a PCIe switch. Likewise, the IO side bridge 21 operates as a downstream port of the PCIe switch. As such, the mutually connected CPU side bridge 14 and IO side bridge 21 operate as a virtual PCIe switch. Further, the CPU side bridge 14 and the IO side bridge 21 can be registered group IDs in advance. In other words, the CPU side bridge 54 and the IO side bridge 61 have a connection management table that can be registered connection destinations in advance.

The virtual bridge resource setting unit 143 sets a virtual PCI bridge and a resource amount. Further, the virtual bridge resource setting unit 143 stores the set number of virtual PCI bridges and the set value of the resource amount.

<BIOS 4>

Figure 6:
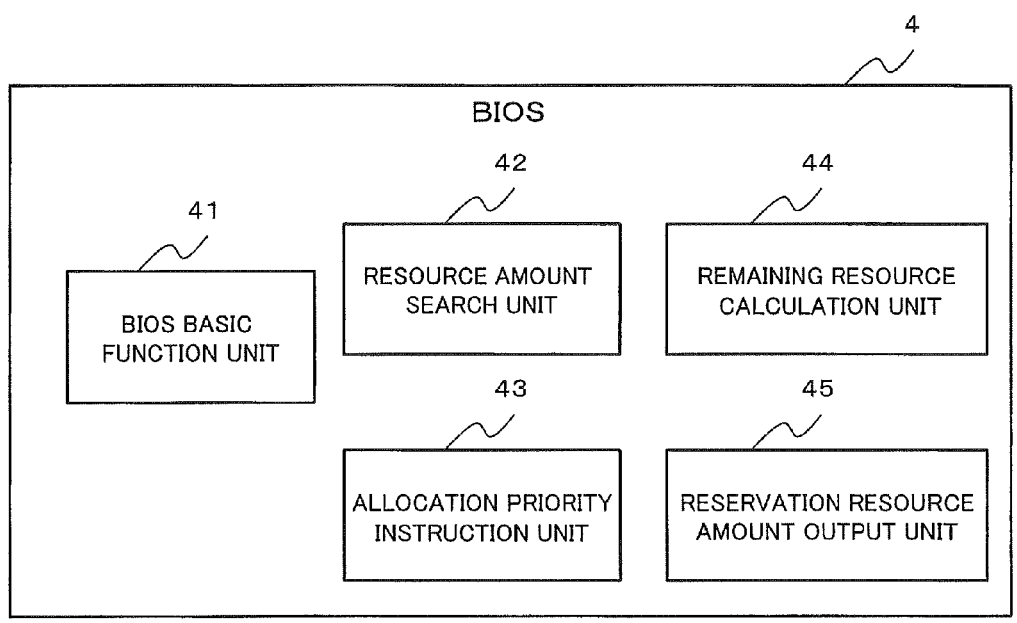
FIG. 6 is a block diagram showing an example of a configuration of BIOS according to the first exemplary embodiment.

FIG. 6 is a block diagram showing an example of the configuration of the main features of the functions of the BIOS 4 of the first exemplary embodiment. The BIOS 4 includes a BIOS basic function unit 41, a resource amount search unit 42, an allocation priority instruction unit 43, a remaining resource calculation unit 44, and a reservation resource amount output unit 45.

As described above, the CPU 11 included in the information processing device 1 executes the program of the BIOS 4 loaded into the memory 12 and the like to realize the functions as the BIOS 4.

The BIOS basic function unit 41 is a portion that performs the basic functions of the BIOS 4. That is, the BIOS basic function unit 41 performs the processing for realizing the functions of the respective components as described below. For example, the BIOS basic function unit 41 performs the functions of the usual boot process of BIOS 4. Thus, the following will not describe the details of the BIOS basic function unit 41.

The resource amount search unit 42 searches the resource amounts of devices on the motherboard of a computer including the CPU side bridge 14 and auxiliary devices.

The allocation priority instruction unit 43 stores an instruction from a user or a fixed value as described below:

(1) Instruction from a user: Prioritize a connection with a larger number of devices or prioritize a connection with a larger use resource amount (2) Fixed value: The number of required additional connection devices or a required reservation resource amount These are an example of a priority condition for allocating resources that is set in the BIOS 4. In other words, the BIOS 4 allocates resources so as to satisfy the above condition.

The remaining resource calculation unit 44 calculates a remaining resource amount by subtracting the resource amount searched by the resource amount search unit 42 from the maximum resource amount of the system.

The reservation resource amount output unit 45 calculates the number of virtual PCI bridges and a reservation resource amount based on information from the allocation priority instruction unit 43 and the remaining resource calculation unit 44. Then, the reservation resource amount output unit 45 outputs (notifies) the number of virtual PCI bridges and the reservation resource amount to the CPU side bridge 14.

[1-2] Description of Operation

Next, the operation of the first exemplary embodiment will be described in detail with reference to FIGS. 7 and 8.

Figure 7:
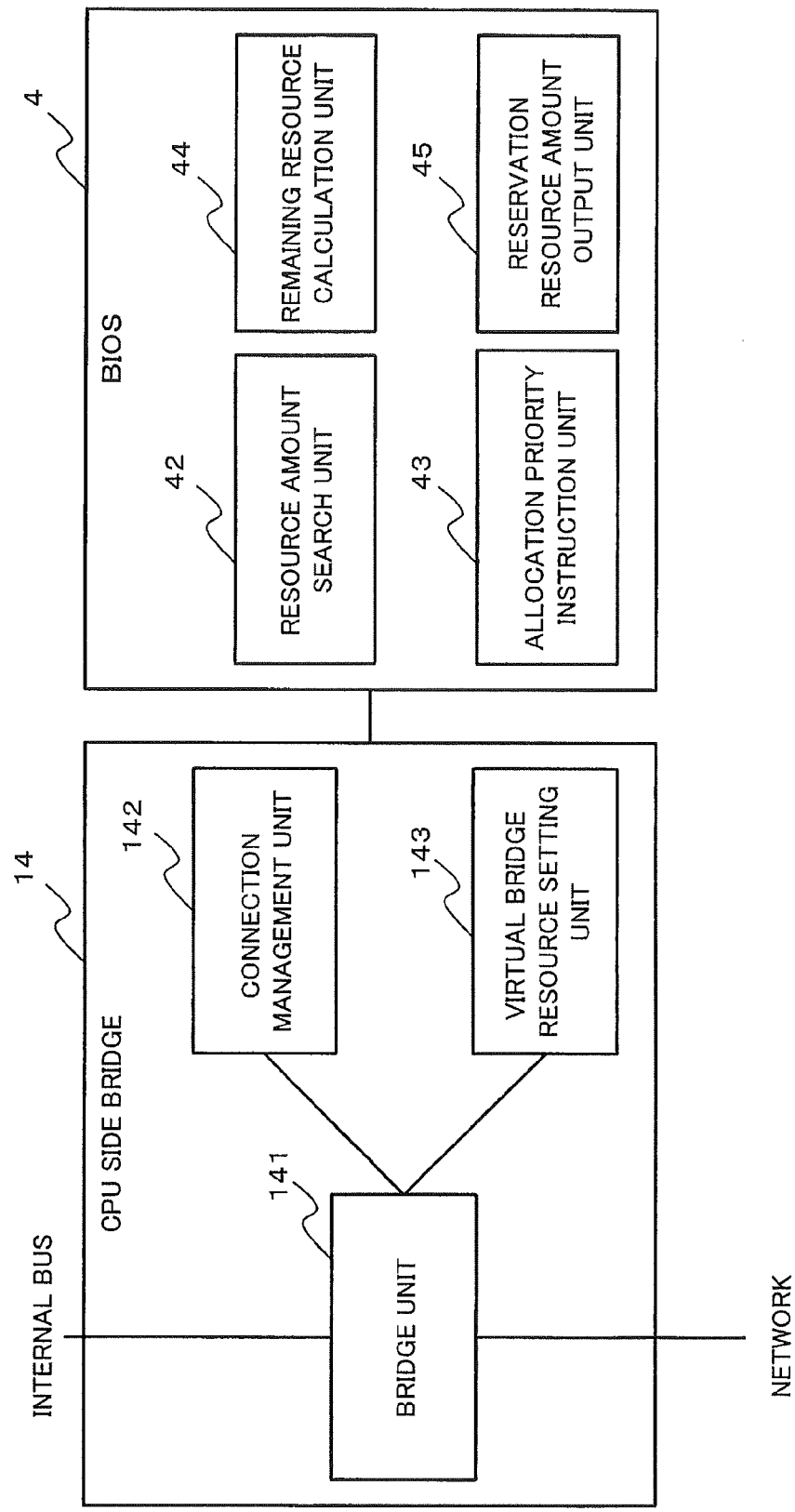
FIG. 7 is a block diagram showing an example of a configuration of the main features of the information processing device according to the first exemplary embodiment.

FIG. 7 is a block diagram showing an example of the main features of the information processing device 1 of the first exemplary embodiment regarding the following description of the operation. In FIG. 7, the same signs are appended to the same components as FIG. 4 and FIG. 6. Thus, descriptions of such components will be omitted. The configuration shown in FIG. 7 is an example of the minimum configuration of the first exemplary embodiment.

Figure 8:
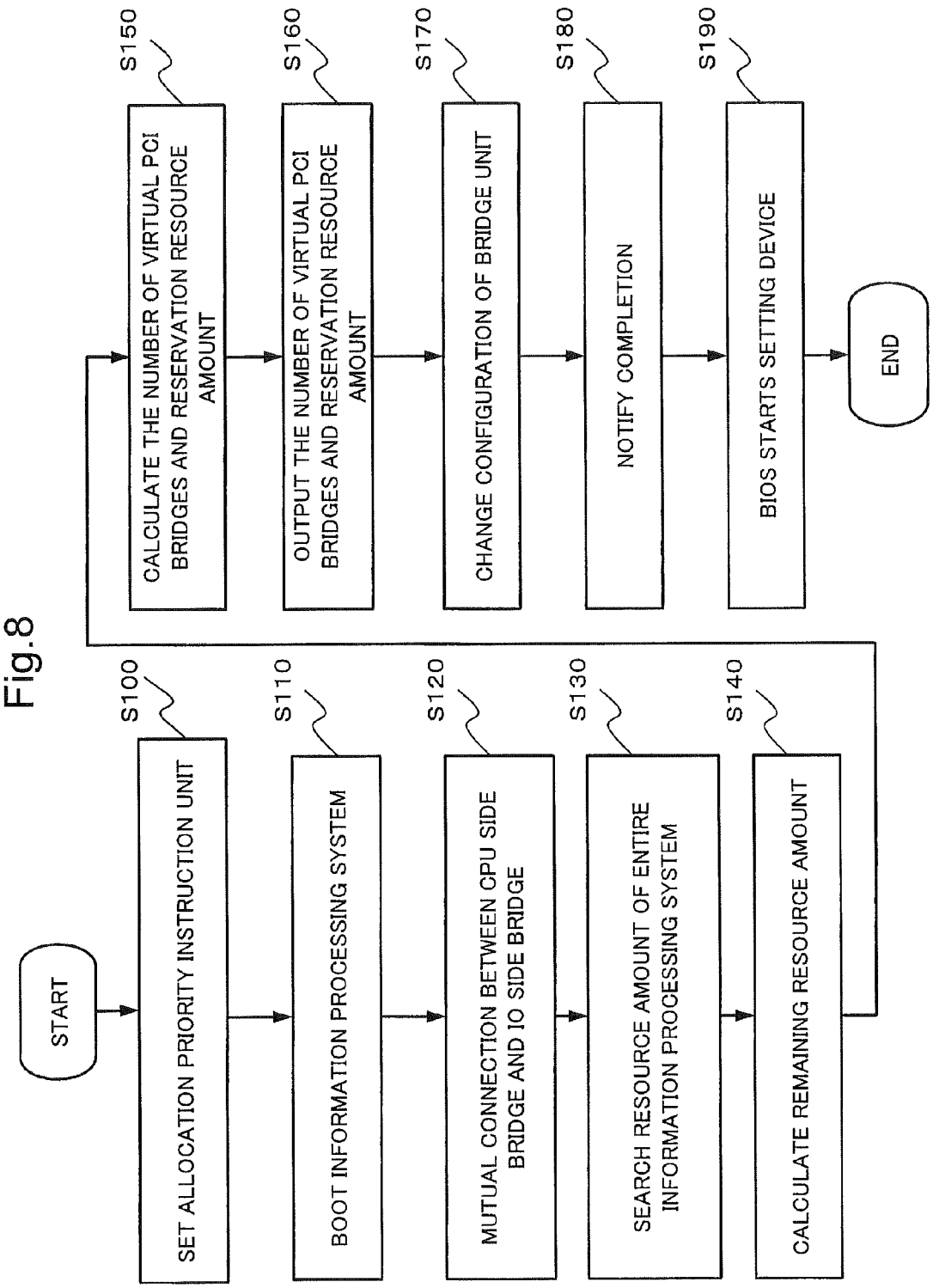
FIG. 8 is a flowchart showing an example of operation of the information processing device according to the first exemplary embodiment.

FIG. 8 is a flowchart showing an example of operation of the information processing device 1 according to the first exemplary embodiment.

First, the information processing device 1 stores an instruction from a user or a fixed value in the allocation priority instruction unit 43 in advance, for example, before booting the entire system (step S100).

Here, as has been described above, the information to be stored is an instruction from a user or a fixed value as follows:

(1) Instruction from a user: Prioritize a connection with a larger number of devices or prioritize a connection with a larger use resource amount (2) Fixed value: The number of required additional connection devices or a required reservation resource amount There is no restriction to the timing of storing the above information to the allocation priority instruction unit 43. For example, when a fixed value is used, a manufacturer of the information processing device 1 may set the fixed value at shipped time from a factory. Alternatively, a user may set the above instruction to the information processing device 1 before booting.

Then, power is applied to the information processing system 8 of the first exemplary embodiment to start booting (step S110). The CPU side bridge 14 and the IO side bridge 21 establish a mutual connection respectively according to the connection management unit 142 and the connection management unit 212 (step S120). As the result, the CPU side bridge 14 becomes a state where it can recognize the IO device 22 that is connected through the IO side bridge 21 as an auxiliary device of the system.

Thereafter, the resource amount search unit 42 of the BIOS 4 searches the resource amount used by the IO devices of the entire information processing system 8 including the IO device 22 that can be recognized as an auxiliary device (step S130). The resource amount search unit 42 of the BIOS 4 may search the resource amount, for example, based on the PCI configuration stored in the PCI configuration register.

The remaining resource calculation unit 44 calculates the remaining resource amount by subtracting the resource amount used by the IO devices that is searched by the resource amount search unit 42 from the maximum resource amount that can be recognized by the BIOS 4 (step S140).

This calculation can be expressed by the following formula:

Remaining resource amount=Maximum resource amount that can be recognized by BIOS 4−Resource amount used by IO devices searched by resource amount search unit 42

Next, the reservation resource amount output unit 45 calculates the number of virtual PCI bridges and the reservation resource amount based on the remaining resource amount calculated by the remaining resource calculation unit 44 and the instruction from a user or fixed value stored in the allocation priority instruction unit 43 (step S150). As has been described above, the instruction from a user or fixed value is a priority condition for allocating resources.

Formulas for respective cases are as follows:

<When Connection with a Larger Amount of Devices is Prioritized>

The number of virtual PCI bridges=Remaining resource amount/Minimum value of reservation resource amount The minimum value of a reservation resource amount is a value specified by a user in advance. However, when there is no value specified by a user, the reservation resource amount output unit 45 may use a predetermined basic value as the minimum value of a reservation resource amount.

<When Connection with a Larger Use Resource Amount is Prioritized>

Reservation resource amount per virtual PCI bridge=Remaining resource amount/Minimum value of the number of virtual PCI bridges The minimum value of the number of virtual PCI bridges is a value specified by a user in advance. However, when there is no value specified by a user, the reservation resource amount output unit 45 may use a predetermined basic value as the minimum value of the number of virtual PCI bridges.

<When a Fixed Value (the Number of Required Additional Connection Devices) is Set>

Reservation resource amount per virtual PCI bridge=Remaining resource amount/The number of required additional connection devices <When a Fixed Value (Required Reservation Resource Amount) is Set>

The number of virtual PCI bridges=Remaining resource amount/Required reservation resource amount The reservation resource amount output unit 45 notifies the result of the above calculation to the virtual bridge resource setting unit 143 of the CPU side bridge 14 (step S160).

According to the notification from the reservation resource amount output unit 45, the virtual bridge resource setting unit 143 sets the number of virtual PCI bridges and the reservation resource amount. That is, the virtual bridge resource setting unit 143 changes (sets) the configuration of the bridge unit 141 (step S170).

After completion of the configuration change of the bridge unit 141, the CPU side bridge 14 notifies the completion to the BIOS 4 (step S180).

After receiving the completion notification, the BIOS 4 starts operation of general functions. For example, the BIOS basic function unit 41 performs a usual boot process. That is, the BIOS 4 starts setting the device (step S190).

The following will describe the effect of the first exemplary embodiment as configured above.

The information processing device 1 according to the first exemplary embodiment can achieve an effect of appropriately allocating resources.

This is because of the following reason:

After a mutual connection between the information processing device 1 and the IO device group 2 is established, the BIOS 4 included in the information processing device 1 searches the resource amount of the entire system. The BIOS 4 is a function realized by the CPU 11 included in the information processing device 1.

Then, the BIOS 4 calculates the remaining resource amount in the recognizable maximum resource amount.

The BIOS 4 calculates the number of virtual PCI bridges and the reservation resource amount so as to satisfy the priority condition for allocating resources.

The CPU side bridge 14 of the information processing device 1 sets the configuration of the bridge unit 141 of the CPU side bridge 14 based on the number of virtual PCI bridges and the reservation resource amount.

As such, the information processing device 1 can consider the resource amount of the entire system to appropriately set the number of virtual PCI bridges and the reservation resource amount in the CPU side bridge 14.

Further, as the first exemplary embodiment can appropriately allocate resources, the first exemplary embodiment can achieve an effect of preventing abnormal operation due to a lack of resources.

Second Exemplary Embodiment

The following will describe the second exemplary embodiment of the present invention with reference to the drawings.

[2-1] Description of Configuration

<Overall Structure of Information Processing System 9>

Figure 9:
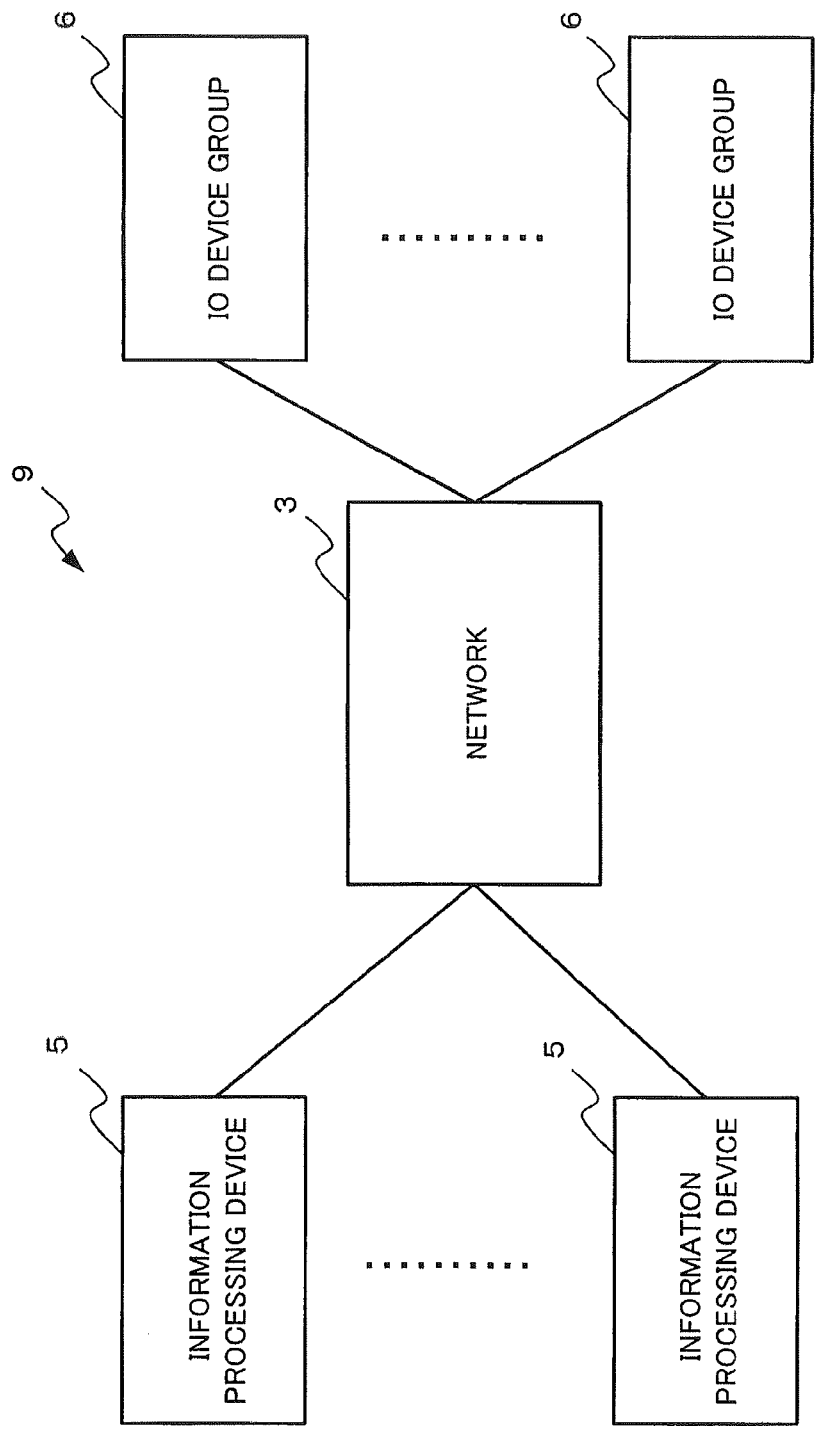
FIG. 9 is a block diagram showing an example of the overall structure of an information processing system that includes an information processing device according to a second exemplary embodiment of the present invention.

FIG. 9 is a block diagram showing an example of the overall structure of an information processing system 9 that includes an information processing device 5 according to the second exemplary embodiment. The information processing system 9 of the second exemplary embodiment includes one or a plurality of information processing devices 5, one or a plurality of IO device groups 6, and a network 3. In the information processing system 9, the information processing devices 5 and the IO device groups 6 are connected via the network 3.

The network 3 is the same as the one of the first exemplary embodiment. As such, the detailed description of the network 3 is omitted herein.

The information processing device 5 performs processing in the information processing system 9. Further, the information processing device 5 allocates resources as will be described later.

The IO device group 6 is a device or a device group that connects with the information processing device 5 via the network 3 and realizes functions as IO device(s).

<Configuration of Information Processing Device 5>

Figure 10:
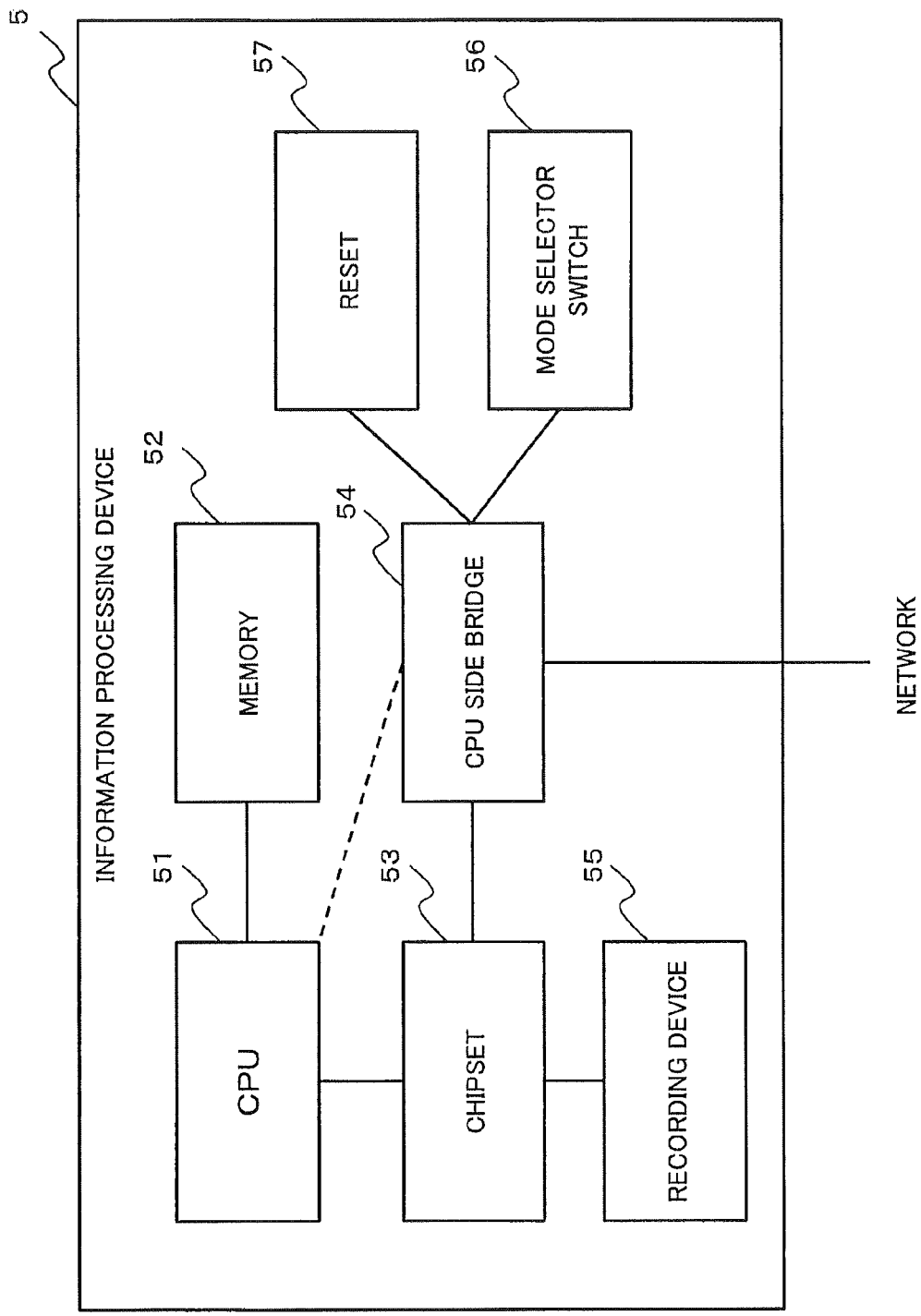
FIG. 10 is a block diagram showing an example of a configuration of the information processing device according to the second exemplary embodiment.

FIG. 10 is a block diagram showing an example of the configuration of the information processing device 5. The information processing device 5 includes one or a plurality of CPUs 51, a memory 52, a chipset 53, a CPU side bridge 54, a recording device 55, a mode selector switch 56, and a reset 57.

The CPU 51 operates based on a program stored in the recording device 55 to control the information processing device 5. In the same way as the CPU 11, the CPU 51 may read the program from a non-transitory recording medium, not shown, that stores the program in a manner readable by a computer. Alternatively, the CPU 51 may receive the program from a device, not shown, via the CPU side bridge 54.

The memory 52 is a storage element, such as D-RAM, or a circuit. The memory 52 may operate as a temporary storage of the CPU 11.

The chipset 53 is a single chip or a combination of a plurality of chips that realizes a predetermined function (e.g., a connection with other circuits) by connecting with the CPU 51. The chipset 53 may support the function of the CPU 51. For example, the chipset 53 may include an auxiliary CPU (co-processor).

As will be described in detail later herein, the CPU side bridge 54 connects the information processing device 5 and the network 3. The CPU side bridge 54 further processes a connection with the IO device group 6 as will be described later herein. The CPU side bridge 54 may be realized, for example, by an NIC such as a LAN card.

The recording device 55 is a storage device, such as ROM or Flash memory, or a circuit. The recording device 55 stores a program or data for the CPU 51. The recording device 55 stores a program of the BIOS 4 in the same way as the first exemplary embodiment. The BIOS 4 program is loaded into the memory 52 at the time of booting of the information processing device 5. The CPU 51 executes the loaded BIOS 4 program to realize the functions as BIOS 4. The recording device 55 may be other device, such as a hard disk device, a magneto-optical disk device, an SSD (Solid State Drive), or a disk array device.

The mode selector switch 56 is a switch that switches the mode of the information processing device 5 as will be described later. The mode selector switch 56 may be a mechanical (hardware) switch. Alternatively, the mode selector switch 56 may be software (e.g., a setting value on the memory).

The reset 57 instructs rebooting (reset) of the information processing device 5. The reset 57 may be a mechanical (hardware) switch. Alternatively, the reset 57 may be an instruction of software, such as a reboot command.

The components included in the information processing device 5 are connected via a predetermined bus. There is no particular restriction to the bus that connects the components of the second exemplary embodiment. As an example, the following bus will be used in the description.

The CPU 51 and the memory 52 are connected via a memory bus. The CPU 51 and the chipset 53 are connected via a CPU bus or a PCIe bus.

The CPU side bridge 54 is connected with the CPU 51 or the chipset 53 via the PCIe bus. The CPU side bridge 54 is connected with the network 3 in accordance with the protocol (e.g., Ethernet (registered trademark)) of the network 3. Further, the CPU side bridge 54 connects with the mode selector switch 56 and the reset 57.

The recording device 55 connects with the CPU 51 or the chipset 53 via a bus that conforms to the interface of the recording device 55.

The CPU 51 and the chipset 53 may also be connected with an IO device, not shown, that is connected inside the chipset 53 or via a route other than the CPU side bridge 54.

<Configuration of IO Device Group 6>

Figure 11:
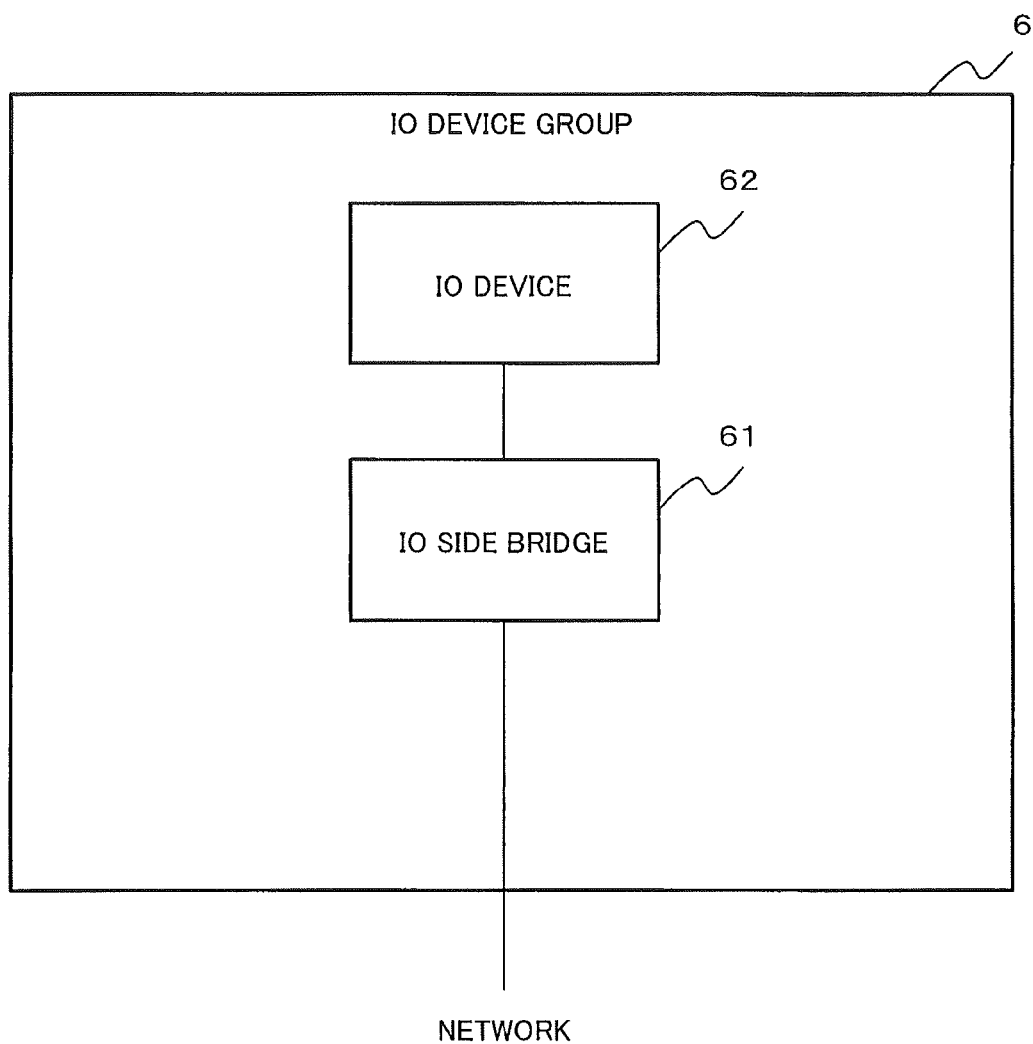
FIG. 11 is a block diagram showing an example of a configuration of an IO device group according to the second exemplary embodiment.

FIG. 11 is a block diagram showing an example of a configuration of an IO device group 6. The IO device group 6 includes one or a plurality of IO side bridges 61 and one or a plurality of IO devices 62.

The IO side bridge 61 is connected with the network 3 in accordance with the protocol (e.g., Ethernet (registered trademark)) of the network 3. Further, the IO side bridge 61 is connected with the IO device 62 via a predetermined bus (e.g., a PCIe bus).

<Configuration of CPU Side Bridge 54 and IO Side Bridge 61>

Figure 12:
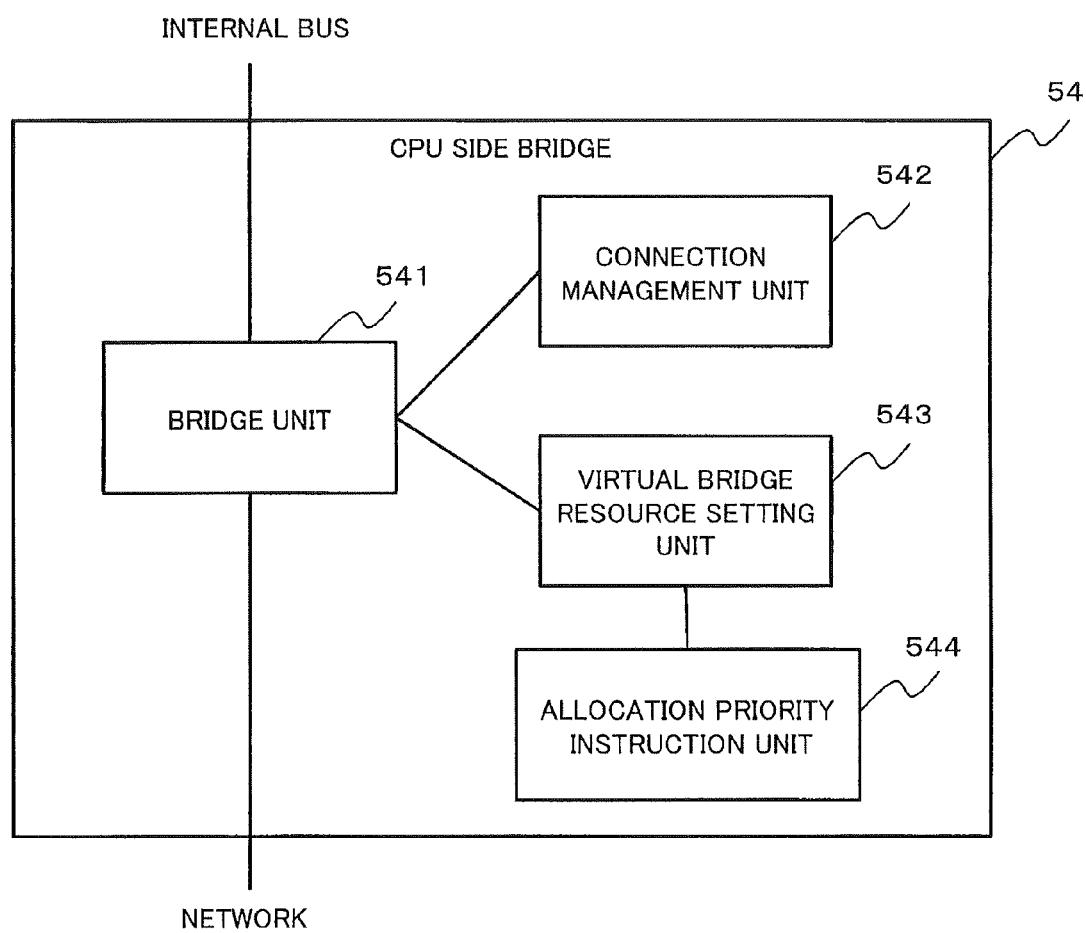
FIG. 12 is a block diagram showing an example of a configuration of a CPU side bridge according to the second exemplary embodiment.

FIG. 12 is a block diagram showing an example of the configuration of the CPU side bridge 54. The CPU side bridge 54 includes a bridge unit 541, a connection management unit 542, a virtual bridge resource setting unit 543, and an allocation priority instruction unit 544. The allocation priority instruction unit 544 may be included in the BIOS 4 in the same way as the first exemplary embodiment.

Figure 13:
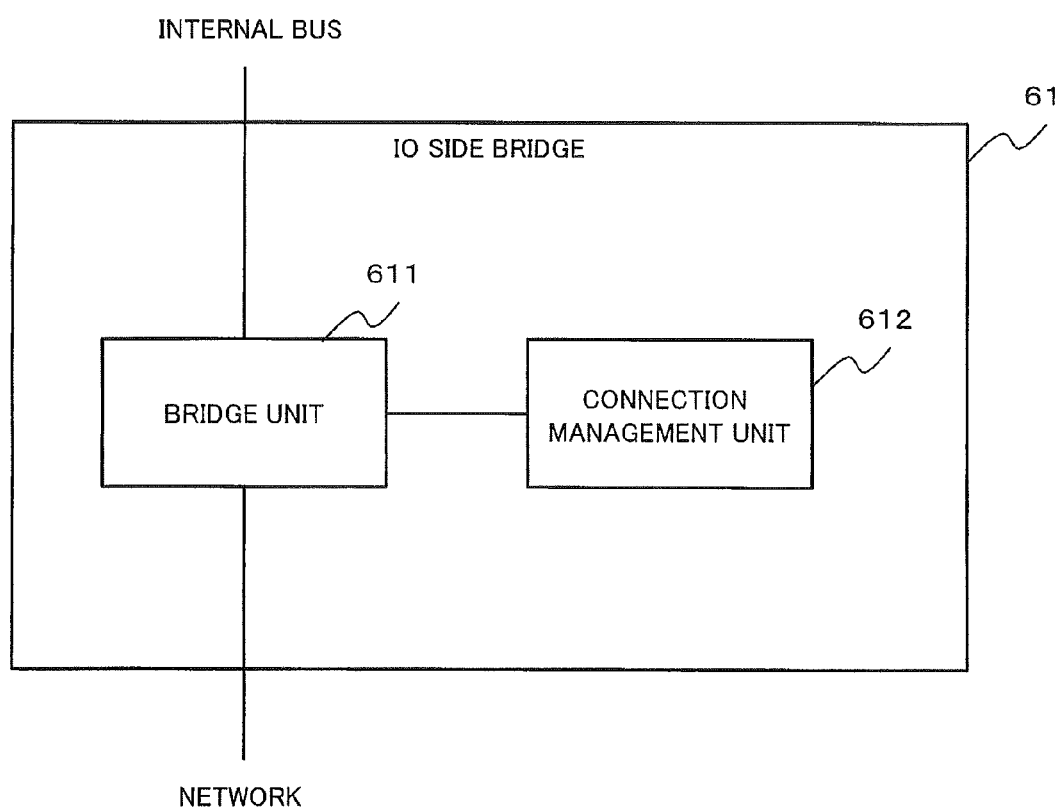
FIG. 13 is a block diagram showing an example of a configuration of an IO side bridge according to the second exemplary embodiment.

FIG. 13 is a block diagram showing an example of the configuration of the IO side bridge 61. The IO side bridge 61 includes a bridge unit 611 and a connection management unit 612.

There is no particular restriction to the bus inside the device and to the network 3 of the second exemplary embodiment. The following description uses PCIe and Ethernet (registered trademark) as the bus inside the device and the network 3 as an example.

The bridge unit 541 and the bridge unit 611 bridge between the bus (e.g., PCIe) inside the device (the CPU 51 or the IO device 62) and the network 3 (e.g., Ethernet (registered trademark)).

For example, when transferring data from the CPU 51 side to the network 3 side or from the IO device 62 side to the network 3 side, the bridge unit 541 and the bridge unit 611 operate as follows. As described above, a case of transferring data from the PCIe side to the Ethernet (registered trademark) side will be described as an example.

First, the bridge unit 541 and the bridge unit 611 add an Ethernet (registered trademark) frame header for a destination to a PCIe packet that includes data. In other words, the bridge unit 541 and the bridge unit 611 encapsulate the PCIe packet for Ethernet (registered trademark). Then, the bridge unit 541 and the bridge unit 611 transmit the encapsulated packet to the network 3.

On the other hand, when transferring data from the network 3 side to the CPU 51 side or from the network 3 side to the IO device 62 side, the bridge unit 541 and the bridge unit 611 operate as follows. Here, a case of transferring data from the Ethernet (registered trademark) side to the PCIe side will be described as an example.

First, the bridge unit 541 and the bridge unit 611 receive an encapsulated packet from the network 3. The bridge unit 541 and the bridge unit 611 remove the Ethernet (registered trademark) frame header from the encapsulated packet to acquire the PCIe packet. Then, the bridge unit 541 and the bridge unit 611 transmit the PCIe packet to the PCIe side.

When the bridge unit 541 and the bridge unit 611 operate as a PCIe device, the bridge unit 541 and the bridge unit 611 have a PCI configuration register.

The connection management unit 542 and the connection management unit 612 have a function of managing a mutual connection between the CPU side bridge 54 and the IO side bridge 61. The CPU side bridge 54 and the IO side bridge 61 can be respectively set group IDs. Then, the CPU side bridge 54 and the IO side bridge 61 that have the same group ID connect each other. The connected CPU side bridge 54 operates as an upstream port of a PCIe switch. Likewise, the IO side bridge 61 operates as a downstream port of the PCIe switch. As such, the mutually connected CPU side bridge 54 and IO side bridge 61 operate as a virtual PCIe switch. Further, the CPU side bridge 54 and the IO side bridge 61 can be registered group IDs in advance. In other words, the CPU side bridge 54 and the IO side bridge 61 respectively have a connection management table that can be registered connection destinations in advance.

The virtual bridge resource setting unit 543 stores the number of existing virtual PCI bridges, setting of a resource space amount, and the set value of the resource space amount.

The allocation priority instruction unit 544 stores an instruction from a user or a fixed value as described below:

(1) Instruction from a user: Prioritize a connection with a larger number of devices or prioritize a connection with a larger use resource amount (2) Fixed value: The number of required additional connection devices or a required reservation use resource amount

[2-2] Description of Operation

Next, the operation of the second exemplary embodiment will be described with reference to FIGS. 14 and 15.

The second exemplary embodiment differs from the first exemplary embodiment in having a test mode in addition to a normal mode that is equivalent to the operation of the first exemplary embodiment. For this reason, the following will describe the operation of a test mode that is unique to the second exemplary embodiment. For a normal mode that is equivalent to the operation of the first exemplary embodiment, the description thereof may be omitted accordingly.

First, the operation of the test mode will be described with reference to FIG. 14.

FIG. 14 is a flowchart showing an example of operation in a test mode of the second exemplary embodiment.

First, before booting of the entire system, the allocation priority instruction unit 544 stores the minimum number of virtual PCI bridges (equivalent to the number of ports of PCIe switches) or the minimum reservation resource amount (reservation memory space quantity and reservation IO space quantity) based on an instruction from a user (step S200). As described above, the allocation priority instruction unit 544 may store a fixed value. Further, there is no particular restriction to the timing that the allocation priority instruction unit 544 stores above-mentioned information.

Then, the information processing device 5 sets the mode selector switch 56 to the test mode (step S210). Here, the information processing device 5 may set the test mode according to an instruction from an external device (e.g., a maintenance terminal device) that is not shown.

Alternatively, when the mode selector switch 56 is a mechanical switch, a user may switch the mode selector switch 56. In such a case, the information processing device 5 may detect the state of the mode selector switch 56, then, perform operation as will be described below.

Next, the information processing device 5 sets a virtual PCI bridge.

The information processing device 5 sets a virtual PCI bridge by the following procedure.

The virtual bridge resource setting unit 543 sets the number of virtual PCI bridges and a reservation resource amount (a reservation memory space quantity and a reservation IO space quantity) to predetermined maximum values (step S220). The predetermined maximum values are values that are set in advance in the virtual bridge resource setting unit 543.

The information processing device 5 performs a boot test (step S230).

When the boot test is successful, the information processing device 5 ends the test mode ("succeed" at step S230).

When the boot test failed ("fail" at step S230), the virtual bridge resource setting unit 543 sets the number of virtual PCI bridges, reservation memory space quantity, and reservation IO space quantity for the next boot according to the instruction from a user that is stored in the allocation priority instruction unit 544.

This operation will be described in further detail.

The virtual bridge resource setting unit 543, first, determines whether or not the set number of virtual PCI bridges, reservation memory space quantity, and reservation IO space quantity are the minimum values stored in the allocation priority instruction unit 544 (step S240).

When they are not the minimum values ("not match" at step S240), the virtual bridge resource setting unit 543 sets the number of virtual PCI bridges, reservation memory space quantity, and reservation IO space quantity to the minimum values (step S270). Then, the information processing device 5 proceeds to step S260.

When they are the minimum values ("match" at step S240), the virtual bridge resource setting unit 543 sets any one of the set values of the number of virtual PCI bridges, reservation memory space quantity, or reservation IO space quantity to a value after subtraction of a predetermined fixed value. However, the virtual bridge resource setting unit 543 subtracts the value of a resource that is different from the one that is set in the previous session, then, sets the subtracted value to the resource (step S250). Then, the information processing device 5 proceeds to step S260. The predetermined fixed value is the value that the virtual bridge resource setting unit 543 retains in advance. As will be described later, the virtual bridge resource setting unit 543 may retain a fixed value corresponding to a resource to be set. Further, as will be described later, the predetermined fixed value is determined in relation to a value stored in the allocation priority instruction unit 544. As such, the virtual bridge resource setting unit 543 may acquire the above-described fixed value at timing when the allocation priority instruction unit 544 stores an instruction from a user or a fixed value. Alternatively, the allocation priority instruction unit 544 stores the above-described fixed value at timing when it stores an instruction from a user or a fixed value, then, the virtual bridge resource setting unit 543 may read the fixed value from the allocation priority instruction unit 544.

The virtual bridge resource setting unit 543 may set a different value, for example, in the following manner.

<When the Allocation Priority Instruction Unit 544 Stores the Minimum Number of Virtual PCI Bridges>

The virtual bridge resource setting unit 543, first, decreases the value that is set in the IO space. At the next setting opportunity, the virtual bridge resource setting unit 543 decreases the value that is set in the memory space. Then, at the following setting opportunity, the virtual bridge resource setting unit 543 decreases the value that is set in the IO space. As such, the virtual bridge resource setting unit 543 changes the reservation resource amount (reservation resource space).

The value of the side that is previously set is set in the IO space or the memory space.

<When the Allocation Priority Instruction Unit 544 Stores the Minimum Memory Space Quantity>

The virtual bridge resource setting unit 543, first, decreases the value that is set for the IO space. At the next setting opportunity, the virtual bridge resource setting unit 543 decreases the value that is set for the number of virtual PCI bridges. Then, at the following setting opportunity, the virtual bridge resource setting unit 543 decreases the value that is set for the IO space. In this way, the virtual bridge resource setting unit 543 changes the setting number of virtual PCI bridges and reservation resource amount (in the IO space).

The value of the side that is previously set is set for the IO space or the number of virtual PCI bridges.

<When the Allocation Priority Instruction Unit 544 Stores the Minimum IO Space Quantity>

The virtual bridge resource setting unit 543, first, decreases the value that is set for the memory space. At the next setting opportunity, the virtual bridge resource setting unit 543 decreases the value that is set for the number of virtual PCI bridges. Then, at the following setting opportunity, the virtual bridge resource setting unit 543 decreases the value that is set for the memory space. In this way, the virtual bridge resource setting unit 543 changes the setting number of virtual PCI bridges and reservation resource amount (for the memory space).

The value of the side that is previously set is set for the memory space or the number of virtual PCI bridges.

After the virtual bridge resource setting unit 543 performed setting (step S270) or subtraction (step S250), the information processing device 5 resets by using the reset 57 (step S260).

After step S260, the information processing device 5 returns to step S230 to perform the boot test.

The information processing device 5 repeats the above-described operation until the boot test succeeds.

When the boot test is successful, the information processing device 5 ends the test mode.

Next, operation of the normal mode after the test mode will be described with reference to the drawings.

FIG. 15 is a flowchart showing an example of operation of the normal mode of the second exemplary embodiment.

After completing the test mode, the information processing device 5 switches the mode selector switch 56 to the normal mode (step S300). The user of the information processing device 5 may switch the mode selector switch 56, then, the information processing device 5 may detect the switching of the mode selector switch 56.

After setting to the normal mode, when power is applied to the information processing system 9 of the second exemplary embodiment of the present invention, the CPU side bridge 54 and the IO side bridge 61 establish mutual connections respectively under the control of the connection management unit 542 and the connection management unit 612 (step S310). Then, the CPU side bridge 54 becomes a state where it can recognize the IO device 62 that is connected with the IO side bridge 61 as an auxiliary device of the system. Here, the virtual PCI bridge is replaced with the IO device 62.

Upon replacement, the CPU side bridge 54 compares the reservation resource amount of the virtual PCI bridge and the resource amount that is actually used by the IO device 62 (step S320).

When the use resource amount of the IO device 62 is smaller than the reservation resource amount (NO at step S330), the information processing device 5 does not change the reservation resource amount and continues the normal operation (boot) of the system.

When the use resource amount of the IO device 62 is larger than the reservation resource amount (YES at step S330), the virtual bridge resource setting unit 543 of the information processing device 5 changes the reservation resource amount as follows.

The information processing device 5 calculates a changed reservation resource amount using the following calculation formula. Then, the information processing device 5 changes the reservation resource amount to the calculated resource amount.

Changed reservation resource amount=Reservation resource amount−(Use resource amount−Reservation resource amount)/The number of virtual PCI bridges In other words, the information processing device 5 subtracts the excess amount of the use resource amount per virtual PCI bridge.

Then, the information processing device 5 sets a flag to a port to which the virtual PCI bridge is connected so as to record the change. Then, the information processing device 5 reboots (resets) by using the reset 57.

The port to which the change flag is set is excluded from comparison objects for resource amounts.

In other words, the resource amount that is changed as above is excluded from comparison objects.

After rebooting, the information processing device 5 boots up by using the changed setting and, thereafter, transfers to normal system operation.

In addition to the effect of the first exemplary embodiment, the second exemplary embodiment can provide an effect of enabling effective utilization of a further detailed resource space.

This is because of the following reason.

In the second exemplary embodiment, the test mode is implemented by using the mode selector switch 56. In the test mode, the virtual bridge resource setting unit 543 sets an appropriate value for succeeding the boot test in the allocation priority instruction unit 544. Then, the information processing device 5 allocates resources by using the set value that is appropriately set in the allocation priority instruction unit 544.

An example of the effects of the present invention is an effect of enabling appropriate allocation of resources.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An information processing device, comprising:
a bridge unit that connects with one or a plurality of input output (IO) devices via a network;
a connection management unit that manages a connection between the bridge unit and the IO devices;
an allocation priority instruction unit that stores an instruction or a fixed value that is used for calculating a number of virtual peripheral components interconnect (PCI) bridges used for reservation of resource and a reservation resource amount;
a resource amount search unit that searches resource amounts used by the IO devices;
a remaining resource calculation unit that calculates a remaining resource amount that is used for calculating a number of virtual PCI bridges and a reservation resource amount and is obtained by subtracting the resource amount used by the IO devices from a maximum resource amount of a system that includes the information processing device and the IO devices;
a reservation resource amount output unit that calculates and outputs the number of virtual PCI bridges and the reservation resource amount based on the remaining resource amount and the instruction or the fixed value;
a virtual bridge resource setting unit that sets the number of virtual PCI bridges and the reservation resource amount to the bridge unit; and
a mode selector unit that switches between a test mode and a normal mode,
wherein, when the mode selector unit is at a test mode, the virtual bridge resource setting unit performs a boot test of the information processing device after setting maximum values for the number of virtual PCI bridges and the reservation resource amount,
wherein, when the boot test fails, the virtual bridge resource setting unit compares the number of virtual PCI bridges and the reservation resource amount with minimum value stored in the allocation priority instruction unit, and then when the number of virtual PCI bridges and the reservation resource amount are not the minimum values, the virtual bridge resource setting unit sets the number of virtual PCI bridges and the reservation resource amount to the minimum values and performs the boot test, and
wherein, when the boot test fails after setting the minimum values, the virtual bridge resource setting unit sets a set value of one of the number of virtual PCI bridges and the reservation resource amount by subtracting a certain value from the set value, and then, performs the boot test.

2. The information processing device according to claim 1, wherein the allocation priority instruction unit stores at least one of an instruction for prioritizing a connection with largest number of devices, an instruction for prioritizing a connection with largest use resource amount, a number of required additional connection devices, and a required reservation resource amount.

3. The information processing device according to claim 1, wherein, when the boot test fails after subtraction, the virtual bridge resource setting unit subtracts a certain value from a set value of the number of virtual PCI bridges or the reservation resource amount that is not a minuend in a preceding session, and then, performs the boot test.

4. The information processing device according to claim 3, wherein, after succeeding the boot test, when the reservation resource amount is smaller than a use resource amount, the virtual bridge resource setting unit changes the reservation resource amount.

5. A resource allocation method for an information processing device that connects with one or a plurality of input output (IO) devices groups via a network, the method comprising:
managing a connection between the information processing device and the IO devices;
storing an instruction or a fixed value that is used for calculating a number of virtual peripheral components interconnect (PCI) bridges used for reservation of resource and a reservation resource amount;
searching resource amounts used by the IO devices;

calculating a remaining resource amount that is used for calculating a number of virtual PCI bridges and a reservation resource amount and is obtained by subtracting a resource amount used by the IO devices from a maximum resource amount of a system that includes the information processing device and the IO devices;

calculating and outputting the number of virtual PCI bridges and the reservation resource amount based on the remaining resource amount and the instruction or the fixed value; and setting, by a virtual bridge resource setting unit, the number of virtual PCI bridges and the reservation resource amount to the information processing device;

switching, by a mode selector unit, between a test mode and a normal mode, wherein, when the mode selector unit is at a test mode, the virtual bridge resource setting unit performs a boot test of the information processing device after setting maximum values for the number of virtual PCI bridges and the reservation resource amount, wherein, when the boot test fails, the virtual bride resource setting unit compares the number of virtual PCI bridges and the reservation resource amount with minimum values stored in the allocation priority instruction unit, and then, when the number of virtual PCI bridges and the reservation resource amount are not the minimum values, the virtual bridge resource setting unit sets the number of virtual PCI bridges and the reservation resource amount to the minimum values and performs the boot test, and wherein, when the boot Lest fails after setting the minimum values, the virtual bridge resource setting unit sets a set value of one of the number of virtual PCI bridges and the reservation resource amount by subtracting a certain value from the set value, and then, performs the boot test.

6. A non-transitory computer readable medium embodying a program, the program causing an information processing device, that connects with one or a plurality of input output (IO) devices via a network, to perform a method, the method comprising:

managing a connection between the information processing device and the IO devices;

storing an instruction or a fixed value that is used for calculating a number of virtual peripheral components interconnect (PCI) bridges used for reservation of resource and a reservation resource amount;

searching resource amounts used by the IO devices;

calculating a remaining resource amount that is use for calculating number of virtual PCI bridges and a reservation resource amount and is obtained by subtracting a resource amount used by the IO devices from a maximum resource amount of a system that includes the information processing device and the IO devices;

calculating and outputting the number of virtual PCI bridges and the reservation resource amount based on the remaining resource amount and the instruction or the fixed value; and setting, by a virtual bridge resource setting unit, the number of virtual PCI bridges and the reservation resource amount to the information processing device;

switching, by a mode selector unit, between a test mode and a normal mode, wherein, when the mode selector unit is at a test mode, the virtual bridge resource setting unit performs a boot test of the information processing device after setting maximum values for the number of virtual PCI bridges and the reservation resource amount, wherein, when the boot test fails, the virtual bridge resource setting unit compares the number of virtual PCI bridges and the reservation resource amount with minimum values stored in the allocation priority instruction unit, and then, when the number of virtual PCI bridges and the reservation resource amount are not the minimum values, the virtual bridge resource setting unit sets the number of virtual PCI bridges and the reservation resource amount to the minimum values and performs the boot test, and wherein, when the boot test fails after setting the minimum values, the virtual bridge resource setting unit sets a set value of one of the number of virtual PCI bridges and the reservation resource amount by subtracting a certain value from the set value, and then, performs the boot test.

7. The information processing device according to claim 1, wherein the boot test is performed in the test mode.

8. The information processing device according to claim 1, wherein, when the boot test fails, and the number of virtual PCI bridges, the reservation resource amount, and a reservation IO space quantity are not the minimum values, the virtual bridge resource setting unit sets the number of virtual PCI bridges, the reservation resource amount, and the reservation IO space quantity to the minimum values.

9. The information processing device according to claim 1, wherein the boot test includes a first type boot test in which the virtual bridge resource setting unit sets the number of virtual PCI bridges, the reservation resource amount, and a reservation IO space quantity to the minimum value.

10. The information processing device according to claim 9, wherein the boot test further includes a second type boot test in which the virtual bridge resource setting unit sets the number of virtual PCI bridges, the reservation resource amount, and the reservation IO space quantity to the set value after subtracting the certain value from the set value.

11. The resource allocation method according to claim 5, wherein the boot test is performed in the test mode.

12. The resource allocation method according to claim 5, wherein, when the boot test fails, and the number of virtual PCI bridges, the reservation resource amount, and a reservation IO space quantity are not the minimum values, the virtual bridge resource setting unit sets the number of virtual PCI bridges, the reservation resource amount, and the reservation IO space quantity to the minimum values.

13. The resource allocation method according to claim 5, wherein the boot test includes a first type boot test in which the virtual bridge resource setting unit sets the number of virtual PCI bridges, the reservation resource amount, and a reservation IO space quantity to the minimum value.

14. The resource allocation method according to claim 13, wherein the boot test further includes a second type boot test in which the virtual bridge resource setting unit sets the number of virtual PCI bridges, the reservation resource amount, and the reservation IO space quantity to the set value after subtracting the certain value from the set value.

15. The non-transitory computer readable medium according to claim 6, wherein the boot test is performed in the test mode.

16. The non-transitory computer readable medium according to claim 6, wherein, when the boot test fails, and the number of virtual PCI bridges, the reservation resource amount, and a reservation IO space quantity are not the minimum values, the virtual bridge resource setting unit sets the number of virtual PCI bridges, the reservation resource amount, and the reservation IO space quantity to the minimum values.

17. The non-transitory computer readable medium according to claim 6, wherein the boot test includes a first type boot test in which the virtual bridge resource setting unit sets the number of virtual PCI bridges, the reservation resource amount, and a reservation IO space quantity to the minimum value.

18. The non-transitory computer readable medium according to claim 17, wherein the boot test further includes a second type boot test in which the virtual bridge resource setting unit sets the number of virtual PCI bridges, the reservation resource amount, and the reservation IO space quantity to the set value after subtracting the certain value from the set value.

* * * * *